US010499368B2

United States Patent
Du et al.

(10) Patent No.: US 10,499,368 B2
(45) Date of Patent: Dec. 3, 2019

(54) CONTROL CHANNEL TRANSMISSION FOR PAGING MESSAGE COVERAGE ENHANCEMENT

(71) Applicant: NOKIA SOLUTIONS AND NETWORKS, Espoo (FI)

(72) Inventors: Lei Du, Beijing (CN); Rapeepat Ratasuk, Hoffman Estates, IL (US); Yan Ji Zhang, Beijing (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/413,761

(22) Filed: May 16, 2019

(65) Prior Publication Data

US 2019/0274118 A1   Sep. 5, 2019

Related U.S. Application Data

(63) Continuation of application No. 15/316,706, filed as application No. PCT/CN2014/079371 on Jun. 6, 2014, now abandoned.

(51) Int. Cl.
*H04W 68/02* (2009.01)
*H04W 72/04* (2009.01)
(Continued)

(52) U.S. Cl.
CPC ............. *H04W 68/02* (2013.01); *H04W 8/02* (2013.01); *H04W 68/005* (2013.01);
(Continued)

(58) Field of Classification Search
CPC ..... H04W 68/005; H04W 8/02; H04W 88/08; H04W 8/005; H04W 8/14; H04W 72/042;
(Continued)

(56) References Cited

U.S. PATENT DOCUMENTS 6,535,745 B1 * 3/2003 Seraj ............................ 455/458
9,002,757 B2 * 4/2015 Kojima ................ G06N 99/005
(Continued)

FOREIGN PATENT DOCUMENTS

CN   102098783 A   6/2011
CN   103428812 A   12/2013
(Continued)

OTHER PUBLICATIONS

Mar. 28, 2019 Office Action issued in Chinese Patent Application No. 201480079090.6.
(Continued)

*Primary Examiner* — Meless N Zewdu
(74) *Attorney, Agent, or Firm* — Squire Patton Boggs (US) LLP

(57) ABSTRACT

Various communication systems may benefit from the proper use of control channel resources. For example, certain communication systems associated with the long term evolution of the third generation partnership project may benefit from physical downlink control channel transmission improvement for paging message coverage enhancement. A method can include obtaining a coverage enhancement paging parameter at a user equipment. The method can also include calculating, by the user equipment, a paging frame or paging occasion according to the paging parameter. In another example, a method can include receiving, at a user equipment, a coverage enhancement paging radio network temporary identifier for use in coverage enhancement mode. The method can also include decoding a physical downlink control channel based on the coverage enhancement paging radio network temporary identifier.

8 Claims, 6 Drawing Sheets

(51) Int. Cl.
*H04W 8/02* (2009.01)
*H04W 68/00* (2009.01)
*H04W 88/08* (2009.01)
*H04L 5/00* (2006.01)
*H04W 88/02* (2009.01)

(52) U.S. Cl.
CPC ......... *H04W 72/042* (2013.01); *H04L 5/0053* (2013.01); *H04W 88/02* (2013.01); *H04W 88/08* (2013.01)

(58) Field of Classification Search
CPC ..... H04W 88/02; H04W 68/02; H04W 72/04; H04W 68/00; H04W 68/025; H04W 68/04; H04W 68/06; H04W 68/08; H04W 68/10; H04W 68/12; H04W 84/005; H04W 84/02; H04W 84/022; H04W 84/027; H04W 88/16; H04W 88/185; H04L 5/0053

See application file for complete search history.

(56) References Cited

U.S. PATENT DOCUMENTS

| | | | |
|---|---|---|---|
| 9,445,378 | B2 | 9/2016 | Yi et al. |
| 2008/0280630 | A1* | 11/2008 | Kalhan et al. ............ 455/458 |
| 2011/0244907 | A1 | 10/2011 | Golaup et al. |
| 2014/0044056 | A1 | 2/2014 | Chen et al. |
| 2014/0119310 | A1 | 5/2014 | Shimizu et al. |
| 2014/0126497 | A1 | 5/2014 | Xu et al. |
| 2015/0230200 | A1* | 8/2015 | Better et al. ........ H04W 68/005 |
| 2015/0365914 | A1 | 12/2015 | Hu et al. |
| 2016/0057738 | A1* | 2/2016 | Lee et al. ........... H04W 72/042 |
| 2016/0205659 | A1 | 7/2016 | Bergman et al. |
| 2016/0234804 | A1* | 8/2016 | Hu et al. ............ H04W 68/005 |
| 2016/0338008 | A1 | 11/2016 | Xia et al. |
| 2017/0019878 | A1 | 1/2017 | Hu et al. |
| 2017/0064670 | A1* | 3/2017 | Shen et al. ......... H04W 68/005 |
| 2017/0150477 | A1 | 5/2017 | Du et al. |
| 2017/0257845 | A1 | 9/2017 | Hu et al. |
| 2018/0152913 | A1* | 5/2018 | Hu et al. ............ H04W 68/02 |

FOREIGN PATENT DOCUMENTS

| | | |
|---|---|---|
| CN | 103580839 A | 2/2014 |
| CN | 103634882 A | 3/2014 |
| EP | 2 081 396 A1 | 7/2009 |
| EP | 2677817 A1 | 12/2013 |
| EP | 3032897 A1 | 6/2016 |
| EP | 3152968 A1 | 4/2017 |
| EP | 3157297 A1 | 4/2017 |
| JP | 2012169970 A | 9/2012 |
| JP | 2013031199 A | 2/2013 |
| JP | 2015-537422 A | 12/2015 |
| WO | 2012043524 A1 | 4/2012 |
| WO | 2013/060763 A1 | 5/2013 |
| WO | 2013169165 A1 | 11/2013 |
| WO | 2014032234 A1 | 3/2014 |
| WO | 2014055878 A1 | 4/2014 |
| WO | 2015149267 A1 | 10/2015 |
| WO | 2015169218 A1 | 11/2015 |
| WO | 2015184642 A1 | 12/2015 |

OTHER PUBLICATIONS

Jun. 10, 2019 Office Action issued in Korean Patent Application No. 10-2018-7003416.

Jun. 13, 2019 Office Action issued in Korean Patent Application No. 10-2018-7003418.

Australian Office Action, Examination Report, Appln. No. 2014396707 dated Aug. 31, 2018. No copy provided, per MPEP 609. Submitted in parent U.S. Appl. No. 15/316,706.

European Search Report issued in corresponding European Patent Appln. No. 14894024.0 dated May 2, 2018. No copy provided, per MPEP 609. Submitted in parent U.S. Appl. No. 15/316,706.

Japanese Notice of Allowance issued in corresponding Japanese Patent Appln. No. 2016-571252 dated Aug. 3, 2018. No copy provided, per MPEP 609. Submitted in parent U.S. Appl. No. 15/316,706.

Alcatel-Lucent et al., S2-132832, 3GPP, Procedure for Extended Long DRX Determining, 2013, pp. 1-7. No copy provided, per MPEP 609. Submitted in parent U.S. Appl. No. 15/316,706.

LG Electronics, R1-140306, 3GPP, (E)PDCCH transmission for MTC coverage enhancement, 2014, pp. 1-6. No copy provided, per MPEP 609. Submitted in parent U.S. Appl. No. 15/316,706.

Huawei et al., R2-140282, 3GPP, Paging in Enhanced Coverage Mode, 2014, pp. 1-3. No copy provided, per MPEP 609. Submitted in parent U.S. Appl. No. 15/316,706.

Mediatek Inc., R1-140239, 3GPP, On the need of PDCCH for SIB, RAR and Paging, 2014, pp. 1-4. No copy provided, per MPEP 609. Submitted in parent U.S. Appl. No. 15/316,706.

Japanese Patent Office Action issued in Japanese Patent Appln. No. 2016-571252, dated Nov. 13, 2017. No copy provided, per MPEP 609. Submitted in parent U.S. Appl. No. 15/316,706.

International Search Report corresponding to International Patent Appln. No. PCT/CN2014/079371, dated Feb. 17, 2015. No copy provided, per MPEP 609. Submitted in parent U.S. Appl. No. 15/316,706.

3GPP TS 36.304 V12.0.0 (Mar. 2014); 3rd Generation Partnership Project; Technical Specification Group Radio Access Network; Evolved Universal Terrestrial Radio Access (E-UTRA; User Equipment (UE) procedures in idle mode (Release 12). No copy provided, per MPEP 609. Submitted in parent U.S. Appl. No. 15/316,706.

3GPP TS 36.331 V12.1.0 (Mar. 2014); 3rd Generation Partnership Project; Technical Specification Group Radio Access Network; Evolved Universal Terrestrial Radio Access (E-UTRA); Radio Resource Control (RRC); Protocol specification (Release 12). No copy provided, per MPEP 609. Submitted in parent U.S. Appl. No. 15/316,706.

R1-140001; MCC Support; Draft Report of 3GPP TSG RAN WG1 #75 v0.1.0; 3GPP TSG RAN WG1 Meeting #76; Prague, CZ Rep., Feb. 10-14, 2014. No copy provided, per MPEP 609. Submitted in parent U.S. Appl. No. 15/316,706.

RP-130848; Vodafone; New WI: Low cost & enhanced coverage MTC UE for LTE; 3GPP TSG RAN meeting #60; Oranjestad, Aruba, Jun. 10-14, 2013; Core, feature & performance part—whole document. No copy provided, per MPEP 609. Submitted in parent U.S. Appl. No. 15/316,706.

European Patent Office, European Search Report corresponding to Appln. No. EP 14894024.0, Jan. 3, 2018. No copy provided, per MPEP 609. Submitted in parent U.S. Appl. No. 15/316,706.

Indonesian Substantive Examination Report for corresponding Application No. P00201607596, dated Feb. 14 2019.

Jun. 3, 2019 Office Action issued in Japanese Patent Application No. 2018-021728.

Jun. 18, 2019 Office Action issued in Canadian Patent Application No. 2,947,077.

Indian Office Action corresponding to Indian Application No. 201617035638, dated Aug. 19, 2019.

* cited by examiner

```
PCCH-Config ::=       SEQUENCE {
    defaultPagingCycle    ENUMERATED {
                              rf32, rf64, rf128, rf256},
    nB                    ENUMERATED {
                              fourT, twoT, oneT, halfT, quarterT, oneEighthT,
                              oneSixteenthT, oneThirtySecondT}
}
```

Figure 2

CONTROL CHANNEL TRANSMISSION FOR PAGING MESSAGE COVERAGE ENHANCEMENT

CROSS REFERENCE TO RELATED APPLICATION

This application is a Continuation of co-pending U.S. patent application Ser. No. 15/316,706, filed on Dec. 6, 2016, which is the National Stage of PCT International Application No. PCT/CN2014/079371, filed on Jun. 6, 2014. The entire content of the above-referenced applications is hereby incorporated by reference.

BACKGROUND

Field

Various communication systems may benefit from the proper use of control channel resources. For example, certain communication systems associated with the long term evolution of the third generation partnership project may benefit from physical downlink control channel transmission improvement for paging message coverage enhancement.

Description of the Related Art

Third generation partnership project (3GPP) RP-130848, which is hereby incorporated by reference in its entirety, describes allowance of a new machine type communication (MTC) operation in long term evolution (LTE) that also allows for enhanced coverage compared to existing LTE networks. Such new MTC operation may aim to provide a relative LTE coverage improvement corresponding to 15 dB for frequency division duplex (FDD) for low complexity user equipment (UEs) and other UEs operating delay tolerant MTC applications with respect to their respective nominal coverage. Repetition may be specified as a method to improve coverage.

With existing paging procedure, the evolved node B (eNB) must be able to schedule the paging message transmission in the appropriate transmission time interval (TTI) and indicate the scheduled physical downlink shared channel (PDSCH) resource in physical downlink control channel (PDCCH) with a paging radio network temporary identifier (P-RNTI). In order to get 15 dB coverage improvement, the PDCCH needs a number of repetitions. As a result there may be PDCCH collision for different UEs in the same subframe.

FIG. 1 illustrates PDCCH repetition to reach coverage enhanced user equipment. As shown in FIG. 1, the PDCCH may need to be retransmitted 20 times to reach the coverage enhanced UEs (CE-UEs). There are three UEs illustrated in this example: UE #1, which needs coverage enhancement and monitors subframe #4 for PDCCH with P-RNTI; UE #2, which does not need coverage enhancement nor PDCCH repetition and which monitors subframe #5 for PDCCH with P-RNTI; and UE #3, which needs coverage enhancement and which monitors subframe #9 for PDCCH with P-RNTI.

The first PDCCH with P-RNTI for UE #1 is transmitted at subframe #4 in frame #1, and it is repeated 20 times in the subsequent subframes, marked in grey. The PDCCH for UE #2 is transmitted at subframe #5 of frame #1. The first PDCCH with P-RNTI for UE #3 is transmitted at subframe #9 in frame #1, and it is repeated 20 times in the subsequent subframes marked in grey.

In this case, there will be two PDCCH indications in subframe #5 of frame #1, and in all the subframes filled with slashed lines, for example subframe #5 of frame #1 where there will be a collision between PDCCH repetition of UE #1 and original PDCCH transmission of UE #2, subframe #9 of frame #1 where there will be a collision between PDCCH repetition of UE #1 and original PDCCH transmission of UE #3; and subframe #0 of frame #2 where there will be a collision of PDCCH repetition between UE #1 and UE #3.

In these subframes, the UE would detect more than one PDCCH and, if each PDCCH is successfully decoded, the UE would have to further receive the respective PDSCH, even though the PDSCH may not be destined to that UE. This brings confusion to the UE and costs the UE power and processing efforts.

SUMMARY

According to certain embodiments, a method can include obtaining a coverage enhancement paging parameter at a user equipment. The method can also include calculating, by the user equipment, a paging frame or paging occasion according to the paging parameter.

A method, according to certain embodiments, can include receiving, at a user equipment, a coverage enhancement paging radio network temporary identifier for use in coverage enhancement mode. The method can also include decoding a physical downlink control channel based on the coverage enhancement paging radio network temporary identifier.

In certain embodiments, a method can include determining whether a paging is for user equipment in coverage enhancement mode. The method can also include indicating in a paging message that the paging is for user equipment in coverage enhancement mode, based on the determining.

An apparatus, according to certain embodiments, can include at least one processor and at least one memory including computer program code. The at least one memory and the computer program code can be configured to, with the at least one processor, cause the apparatus at least to obtain a coverage enhancement paging parameter at a user equipment. The at least one memory and the computer program code can also be configured to, with the at least one processor, cause the apparatus at least to calculate, by the user equipment, a paging frame or paging occasion according to the paging parameter.

In certain embodiments, an apparatus can include at least one processor and at least one memory including computer program code. The at least one memory and the computer program code can be configured to, with the at least one processor, cause the apparatus at least to receive, at a user equipment, a coverage enhancement paging radio network temporary identifier for use in coverage enhancement mode. The at least one memory and the computer program code can also be configured to, with the at least one processor, cause the apparatus at least to decode a physical downlink control channel based on the coverage enhancement paging radio network temporary identifier.

An apparatus, in certain embodiments, can include at least one processor and at least one memory including computer program code. The at least one memory and the computer program code can be configured to, with the at least one processor, cause the apparatus at least to determine whether a paging is for user equipment in coverage enhancement mode. The at least one memory and the computer program code can also be configured to, with the at least one processor, cause the apparatus at least to indicate in a paging message that the paging is for user equipment in coverage enhancement mode, based on the determining.

According to certain embodiments, a non-transitory computer-readable medium can be encoded with instructions that, when executed in hardware, perform a process. The process can include obtaining a coverage enhancement paging parameter at a user equipment. The process can also include calculating, by the user equipment, a paging frame or paging occasion according to the paging parameter.

In certain embodiments, a non-transitory computer-readable medium encoded with instructions that, when executed in hardware, perform a process. The process can include determining whether a paging is for user equipment in coverage enhancement mode. The process can also include indicating in a paging message that the paging is for user equipment in coverage enhancement mode, based on the determining.

A computer program product, according to certain embodiments, can encode instructions for performing a process. The process can include obtaining a coverage enhancement paging parameter at a user equipment. The process can also include calculating, by the user equipment, a paging frame or paging occasion according to the paging parameter.

A computer program product, in certain embodiments, can encode instructions for performing a process. The process can include determining whether a paging is for user equipment in coverage enhancement mode. The process can also include indicating in a paging message that the paging is for user equipment in coverage enhancement mode, based on the determining.

BRIEF DESCRIPTION OF THE DRAWINGS

For proper understanding of the invention, reference should be made to the accompanying drawings, wherein:

FIG. 2 illustrates PCCH-Config according to 3GPP TS 36.331.

DETAILED DESCRIPTION

Figure 1:
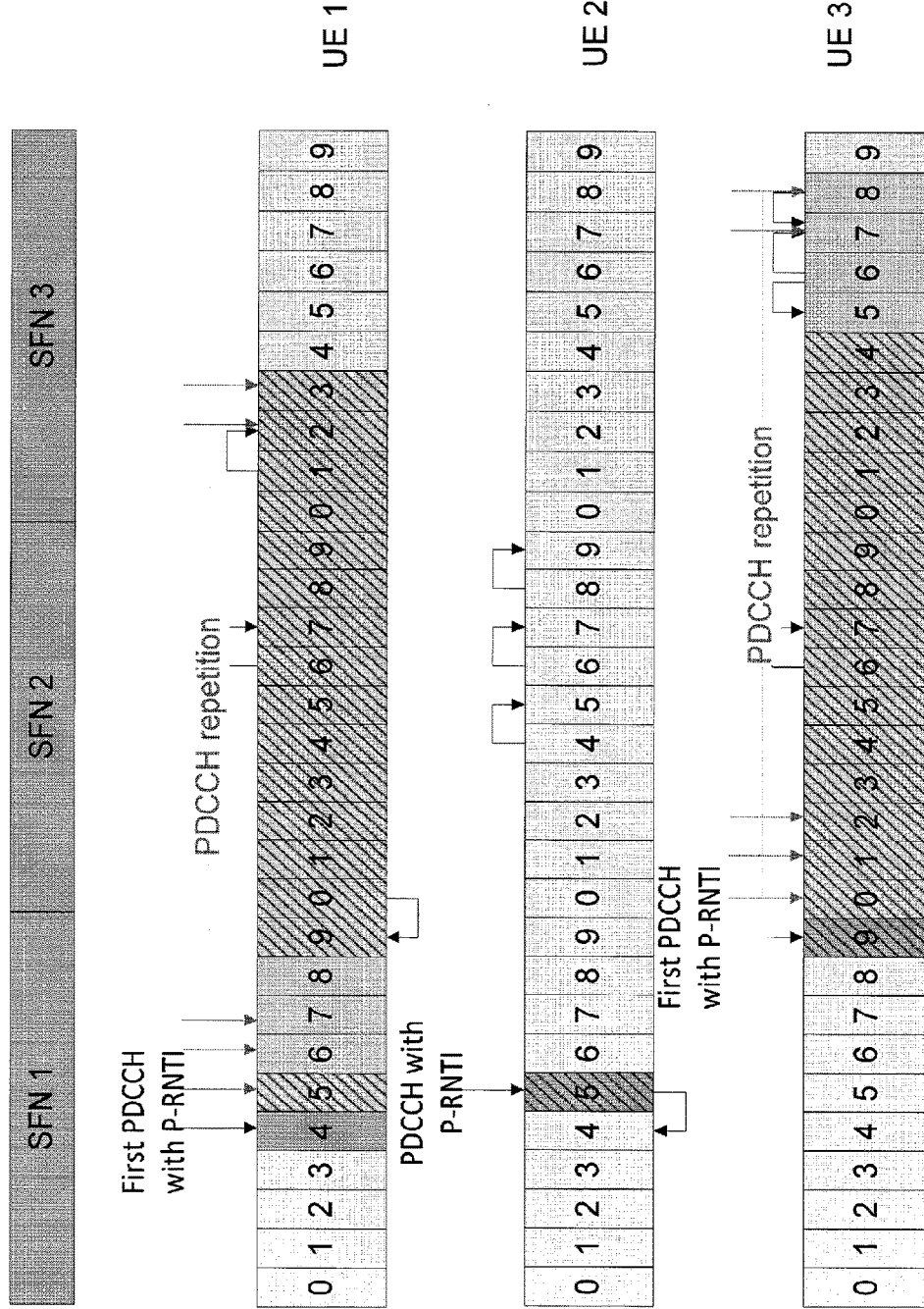
FIG. 1 illustrates PDCCH repetition to reach coverage enhanced user equipment.

It is planned that for machine type communications (MTC), an enhanced coverage mode for UEs will provide a 15-20 dB improvement. In order to achieve this 15-20 dB improvement, a number of repetitions of the scheduled resources in the PDCCH may be performed, which may lead to collisions. Certain embodiments provide a mechanism whereby for those UEs that are in a coverage enhancement mode, a separate coverage enhancement nB is defined from which these UEs can calculate their paging occasions. Certain embodiments may also provide a separate coverage enhancement P-RNTI to address the PDCCH for enhanced coverage mode UEs. In case of a PDCCH overlap with UEs that are not in a coverage enhancement mode, the coverage enhancement mode nB can be used in order to, for example, keep a low density of paging occasions, so that there may be no collisions on the PDCCH.

Certain embodiments may define a separate CE-nB for a UE in coverage enhancement mode, which could be decided based on a required repetition number. Furthermore, in certain embodiments a coverage enhanced UE can calculate the UE's paging frame/paging occasion according to a CE-nB instead of the nB advertised in current specification. According to certain embodiments, an MME can indicate in a paging message to the eNB whether the paging is for UEs in CE mode.

If available, a repetition level for the UE could be also indicated. This information might be available, for example, for stationary UE. The repetition level of the UE can be conveyed to the MME when the UE moves to idle mode. The paging records in the paging message can address UEs in CE mode with the same repetition level.

In certain embodiments a separate coverage enhancement paging radio network temporary identifier (CE-P-RNTI) is defined for UE in coverage enhancement mode. Multiple CE-P-RNTIs could be defined for each repetition level, for example if a repetition level for each UE is known by the MME.

The eNB can dynamically derive the CE-P-RNTI based on the repetition level in paging message to transmit PDCCH. The UE can decode the PDCCH by the CE-P-RNTI corresponding to the UE's repetition level.

Any desired paging occasion (PO)/paging frame (PF) calculation can be applied for UE in coverage enhancement mode. If there is PDCCH overlapping with current nB, a separate coverage enhanced nB (CE-nB) can be applied for the CE-UE in order to keep a low density of PO for UE in coverage enhancement mode and thereby, for example, to make sure there is no collision of the PDCCH (re)-transmission within a single subframe. The value of CE-nB can, for example, be decided based on the repetition number of PDCCH, for example how many times the PDCCH is to be transmitted. For example, if the required repetition number is N, and the paging cycle is T, CE-nB can be set to one of the available values smaller than (T*10/N), if nB>(T*10/N), based on the PCCH-Config defined in 3GPP 36.331 as shown in FIG. 2.

For example, if the repetition number for PDCCH is 120, then the CE-nB for UE in coverage enhancement can be set to oneSixteenthT or oneThirtySecondT, while for normal UEs, the nB used for PO derivation can remain unchanged. In certain embodiments, the nearest value satisfying CE-nB<T*10/N can be selected.

In addition, the Ns parameter can be updated for UE in coverage enhancement from the equation below based on CE-nB: Ns=max (1, CE-nB/T)

Thus value of Ns may always be 1 for a UE in coverage enhancement mode, because the required repetition number of PDCCH transmission may be larger than 10. Thus, there may only be one subframe available for paging in the paging frame. The subframe may be subframe #9 for FDD and subframe #0 for TDD, based on the subframe pattern defined in 3GPP technical specification (TS) 36.204v12.0.0, "User Equipment (UE) procedures in idle mode," which is hereby incorporated herein by reference in its entirety.

The UE in coverage enhancement mode can still wake up every discontinuous reception (DRX) cycle in the original PO, as derived for example from the formulae in 3GPP TS 36.304, to monitor the PDCCH channel with CE-P-RNTI and continue to receive the PDCCH repetition marked with CE-P-RNTI from the consecutive subframes until it receives all the required number of PDCCH transmission or could decode the PDCCH successfully. The CE-P-RNTI can be a new type of RNTI for differentiating PDCCH transmission between the normal UE and UE in CE mode.

Figure 3:
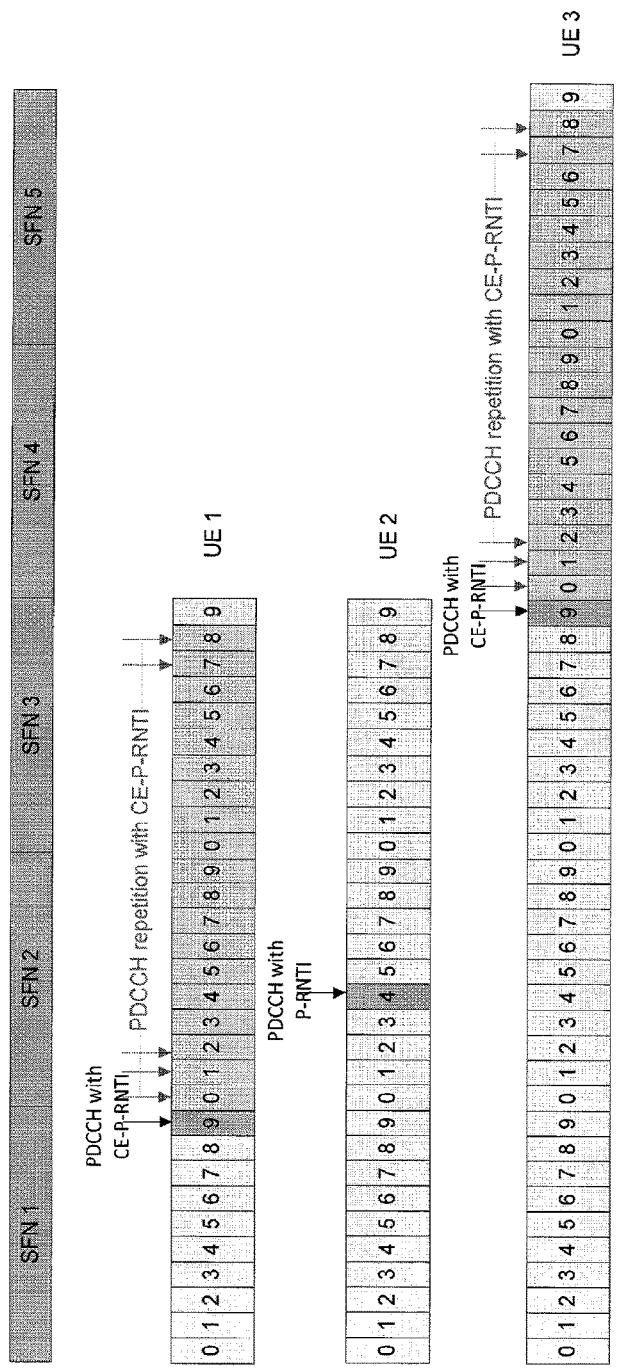
FIG. 3 illustrates a procedure of the PDCCH transmission according to certain embodiments.

FIG. 3 illustrates a procedure of the PDCCH transmission according to certain embodiments. In this particular example, the required repetition number can be 20, based on the CE-nB calculation equation: CE-nB=T/2. There are three UEs in this example: UE #1, which needs coverage enhancement and monitors the subframe #9 for PDCCH with CE-P-RNTI using CE-nB; UE #2, which does not need coverage enhancement, has no PDCCH repetition, and monitors the subframe #4 for PDCCH with P-RNTI using normal nB; and UE #3 needs coverage enhancement and monitors the subframe #9 for PDCCH with CE-P-RNTI (using CE-nB).

The first PDCCH with CE-P-RNTI for UE #1 is, in this example, transmitted at subframe #9 in frame #1, and it is repeated 19 times marked with CE-P-RNTI in the subsequent subframes, marked in grey. The PDCCH for UE #2 is, in this example, transmitted at subframe #4 of frame #2. The first PDCCH with CE-P-RNTI for UE #3 is, in this example, transmitted at subframe #9 in frame #3, and the PDCCH is repeated 19 times marked with CE-P-RNTI in the subsequent subframes, marked in grey.

In this example, there is only a single PDCCH marked either with P-RNTI or CE-P-RNTI in one subframe. For example, in subframe #4 of frame #2 there is a PDCCH repetition marked with CE-P-RNTI for UE #1 and PDCCH transmission with P-RNTI for UE #2. There would not, in this example, be any repetition collision for PDCCH repetition marked with CE-P-RNTI in any subframe.

Figure 4:
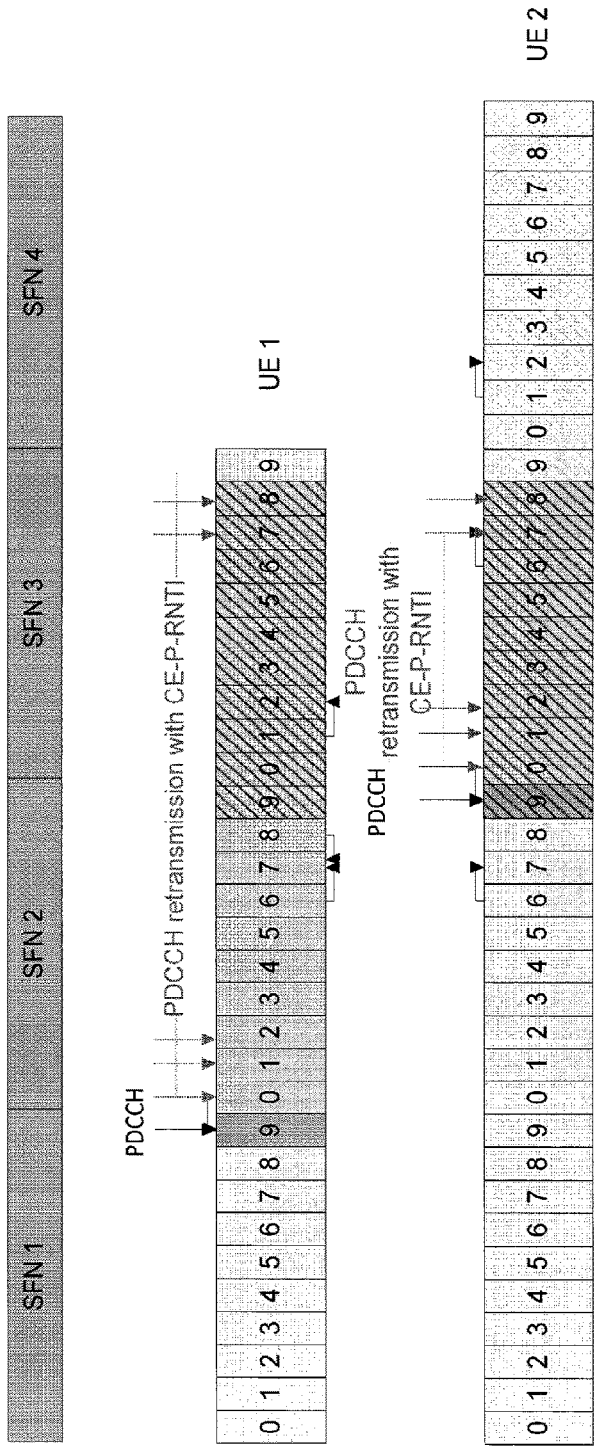
FIG. 4 illustrates the possibility of multiple repetition levels in one cell, according to certain embodiments.

FIG. 4 illustrates the possibility of multiple repetition levels in one cell, according to certain embodiments. As shown in FIG. 4, there can be multiple repetition levels in one cell and that overlapping of PDCCH may occur in this case. For example, for UE #1 a repetition number is 20, CE-nB=½T and in this example for UE #2 a repetition number is 10, CE-nB=T. Thus, in this example, there is still overlap for PDCCH repetition in frame #3.

One approach that avoids such an outcome is to assign a different value for CE-P-RNTI based on the repetition level of the UE. The repetition level could be transferred, for example by the UE, to the MME when the UE moves from connected mode to idle mode and can then be indicated from the MME to the eNB in a paging message. Alternatively, the repetition level could be transferred from the eNB to the MME when the UE moves from connected mode to idle mode and then be indicated from the MME to the eNB in a paging message. The eNB can derive the CE-P-RNTI of the UE for transmitting PDCCH for paging.

With the same example as shown in FIG. 4, even in frame #3 when there are two PDCCHs the UE could find the correct PDCCH by its dedicated CE-P-RNTI because they have a different repetition level. Thus, this approach can ensure that each UE could get a dedicated PDCCH within a single subframe.

Figure 5:
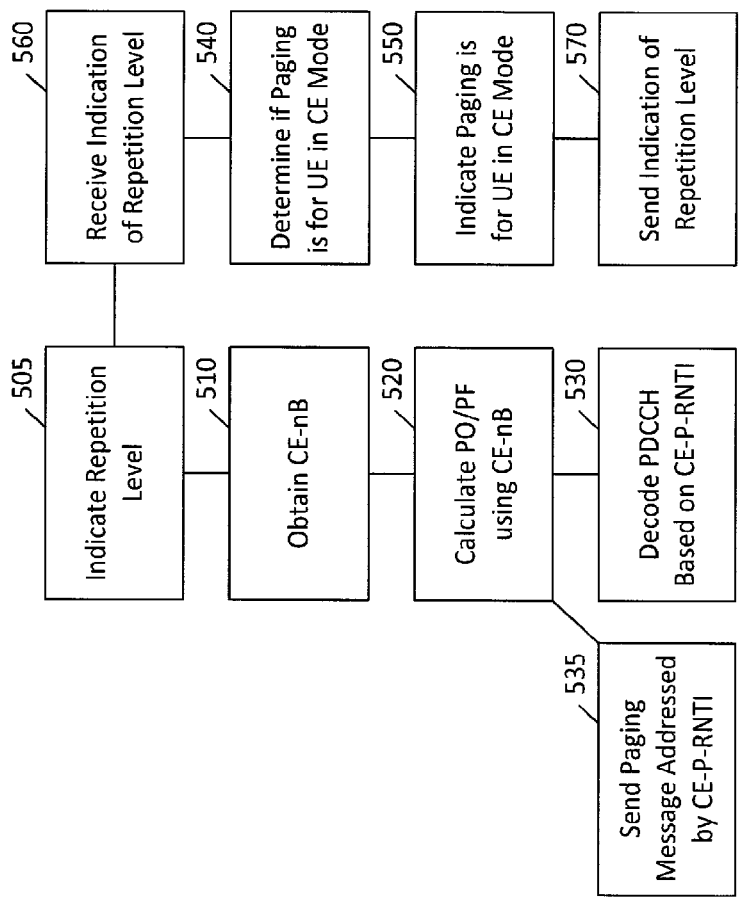
FIG. 5 illustrates a method according to certain embodiments.

FIG. 5 illustrates a method according to certain embodiments. The method can include, at 510, obtaining a coverage enhancement paging parameter, CE-nB, at a user equipment. CE-nB may be configured for use only when the user equipment is in coverage enhancement mode.

The method can also include, at 520, calculating, by the user equipment, a paging frame or paging occasion according to the CE-nB.

The method can further include, at 505, indicating a repetition level for the user equipment to a mobility management entity for later use. The obtained CE-nB can be based on the repetition level stored at the UE. The repetition level of the user equipment can be conveyed to the mobility management entity when the user equipment moves to idle mode.

The user equipment can derive a CE-P-RNTI for use in coverage enhancement mode. The method can additionally include, at 530, decoding a physical downlink control channel based on the CE-P-RNTI. The CE-P-RNTI can be one of a plurality of CE-P-RNTI and can be derived based on the stored repetition level.

Although blocks 505, 510, and 520 have been described above in terms that may be applicable to a UE, the blocks can also refer to eNB behavior. For example, the method can include, at 505, indicating repetition level from eNB to MME. The method can also include, at 560, receiving paging message including repetition level from MME. The method can further include, at 510, obtaining CE-nB based on the repetition level. The method can additionally include, at 520, calculating PF/PO based on CE-nB. Moreover, at 535 the method can include sending paging message addressed by CE-P-RNTI on the calculated PF/PO based on respective CE-nB. The CE-P-RNTI can be one of a plurality of CE-P-RNTI and can be derived based on the stored repetition level.

The method can also include, at 540, determining, for example by an MME, whether a paging is for user equipment in coverage enhancement mode. The method can also include, at 550, indicating in a paging message that the paging is for user equipment in coverage enhancement mode, based on the determining.

The method can further include, at 560, receiving (by an MME, or by an eNB from an MME, as described above) an indication of a repetition level for the user equipment, wherein the determining and/or obtaining is based on the repetition level. The repetition level of the user equipment is conveyed to a mobility management entity when the user equipment moves to idle mode, as mentioned above. Thus, the method can also include, at 570, sending the indication of the repetition level from the MME to the eNB.

Figure 6:
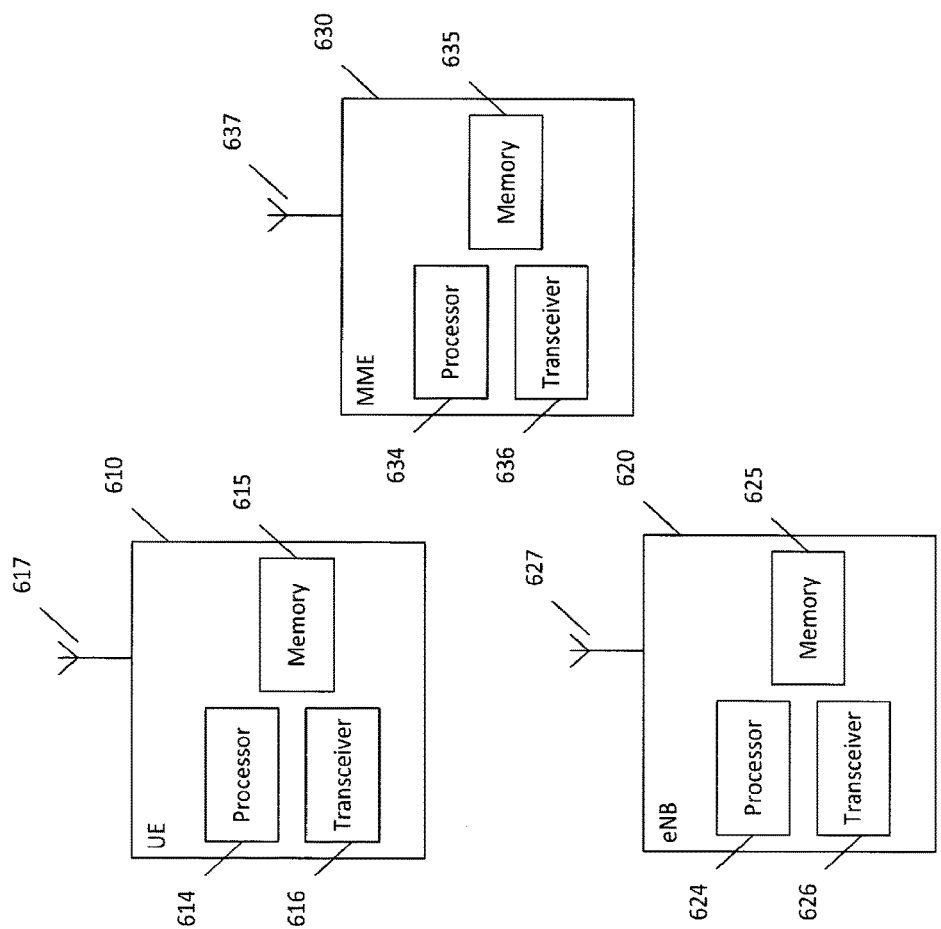
FIG. 6 illustrates a system according to certain embodiments.

FIG. 6 illustrates a system according to certain embodiments of the invention. In one embodiment, a system may include multiple devices, such as, for example, at least one UE 610, at least one eNB 620 or other base station or access point, and at least one MME 630. In certain systems, UE 610, eNB 620, MME 630, and a plurality of other user equipment and MMEs may be present. Other configurations are also possible, including those with multiple base stations, such as eNBs. The UE 610 may be equipped for both cellular and D2D communication.

Each of these devices may include at least one processor, respectively indicated as 614, 624, and 634. At least one memory may be provided in each device, as indicated at 615, 625, and 635, respectively. The memory may include computer program instructions or computer code contained therein. The processors 614, 624, and 634 and memories 615, 625, and 635, or a subset thereof, may be configured to provide means corresponding to the various blocks of FIGS. 3-5. Although not shown, the devices may also include positioning hardware, such as global positioning system (GPS) or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 6, transceivers 616, 626, and 636 may be provided, and each device may also include at least one antenna, respectively illustrated as 617, 627, and 637. The device may have many antennas, such as an array of antennas configured for multiple input multiple output (MIMO) communications, or multiple antennas for multiple radio access technologies. Other configurations of these devices, for example, may be provided. For example, eNB 620 and MME 630 may additionally or solely be configured for wired communication, and in such a case antennas 627, 637 would also illustrate any form of communication hardware, without requiring a conventional antenna.

Transceivers 616, 626, and 636 may each, independently, be a transmitter, a receiver, or both a transmitter and a receiver, or a unit or device that is configured both for transmission and reception.

Processors 614, 624, and 634 may be embodied by any computational or data processing device, such as a central processing unit (CPU), application specific integrated circuit (ASIC), or comparable device. The processors may be implemented as a single controller, or a plurality of controllers or processors.

Memories 615, 625, and 635 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language.

The memory and the computer program instructions may be configured, with the processor for the particular device, to cause a hardware apparatus such as UE 610, eNB 620, and MME 630, to perform any of the processes described above (see, for example, FIGS. 3-5). Therefore, in certain embodiments, a non-transitory computer-readable medium may be encoded with computer instructions that, when executed in hardware, perform a process such as one of the processes described herein. Alternatively, certain embodiments may be performed entirely in hardware.

Furthermore, although FIG. 6 illustrates a system including a UE, eNB, and MME, embodiments of the invention may be applicable to other configurations, and configurations involving additional elements.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Partial Glossary
AS—Access Stratum
CN—Core Network
DL—Down Link
MME—Mobility Management Entity
MO—Mobile Originating
MTC—Machine Type Communication
NAS—Non Access Stratum
RAN—Radio Access Network
RRC—Radio Resource Control
UE—User Equipment
UL—Up Link
TAU—Tracking Area Update

We claim:

1. A method, comprising:
   obtaining, at or for a user equipment, a coverage enhancement paging parameter configured for use only when the user equipment is in a coverage enhancement mode; and
   calculating, by a base station or the user equipment, a paging frame or paging occasion according to the paging parameter, wherein the paging parameter is derived such that the coverage enhancement paging parameter is set to a value that is smaller than (T*10/N), wherein T represents a paging cycle, and N represents a repetition number.

2. The method of claim 1, further comprising:
   indicating a repetition level for the user equipment to a mobility management entity, wherein the obtained paging parameter is based on the repetition level.

3. The method of claim 2, wherein the repetition level of the user equipment is conveyed to the mobility management entity when the user equipment moves to idle mode.

4. The method of claim 1, wherein the base station calculating the paging parameter comprises a coverage enhanced Node B (CE-nB).

5. An apparatus, comprising:
   at least one processor; and
   at least one memory including computer program code,
   wherein the at least one memory and the computer program code are configured to, with the at least one processor, cause the apparatus at least to:
   obtain a coverage enhancement paging parameter configured for use only when the apparatus is in a coverage enhancement mode; and
   calculate a paging frame or paging occasion according to the paging parameter, wherein the paging parameter is derived such that the coverage enhancement paging parameter is set to a value that is smaller than (T*10/N), wherein T represents a paging cycle, and N represents a repetition number.

6. The apparatus of claim 5, wherein the at least one memory and the computer program code are configured to, with the at least one processor, cause the apparatus at least to indicate a repetition level for the user equipment to a mobility management entity, wherein the obtained paging parameter is based on the repetition level.

7. The apparatus of claim 6, wherein the repetition level of the user equipment is conveyed to the mobility management entity when the user equipment moves to idle mode.

8. The apparatus of claim 5, wherein the paging parameter comprises a coverage enhanced Node B.

* * * * *